United States Patent [19]
Haupt

[11] B 3,918,540
[45] Nov. 11, 1975

[54] REMOVABLE SIDE PANEL
[75] Inventor: Robert C. Haupt, Milwaukee, Wis.
[73] Assignee: Allis-Chalmers Corporation, Milwaukee, Wis.
[22] Filed: Jan. 29, 1973
[21] Appl. No.: 327,674
[44] Published under the Trial Voluntary Protest Program on January 28, 1975 as document no. B 327,674.

[52] U.S. Cl. .............................. 180/69 R; 49/465
[51] Int. Cl.² ........................................ B62D 25/12
[58] Field of Search .......... 180/69 R, 54 A; 49/463, 49/465, 381, 257; 280/153 R, 477

[56] References Cited
UNITED STATES PATENTS

| | | | |
|---|---|---|---|
| 1,992,496 | 2/1935 | Marmon et al. | 180/69 R |
| 2,584,329 | 2/1952 | Clapper | 180/54 A |
| 2,733,772 | 2/1956 | Lamb | 180/69 R |
| 2,882,089 | 4/1959 | Vaszin | 180/69 R X |
| 2,967,324 | 1/1961 | Gagnier | 180/69 R X |
| 3,123,380 | 3/1964 | Grim et al. | 280/477 UX |
| 3,207,250 | 9/1965 | Bamford | 180/54 A X |
| 3,270,462 | 9/1966 | Obadal et al. | 180/69 UX |
| 3,743,045 | 7/1973 | Hansen | 180/69 R |
| 3,754,614 | 8/1973 | Habas | 180/69 C |

Primary Examiner—David Schonberg
Assistant Examiner—David M. Mitchell
Attorney, Agent, or Firm—Arthur L. Nelson

[57] ABSTRACT

A removable side panel on a tractor permitting access to the engine compartment and the accessory compartment.

10 Claims, 8 Drawing Figures

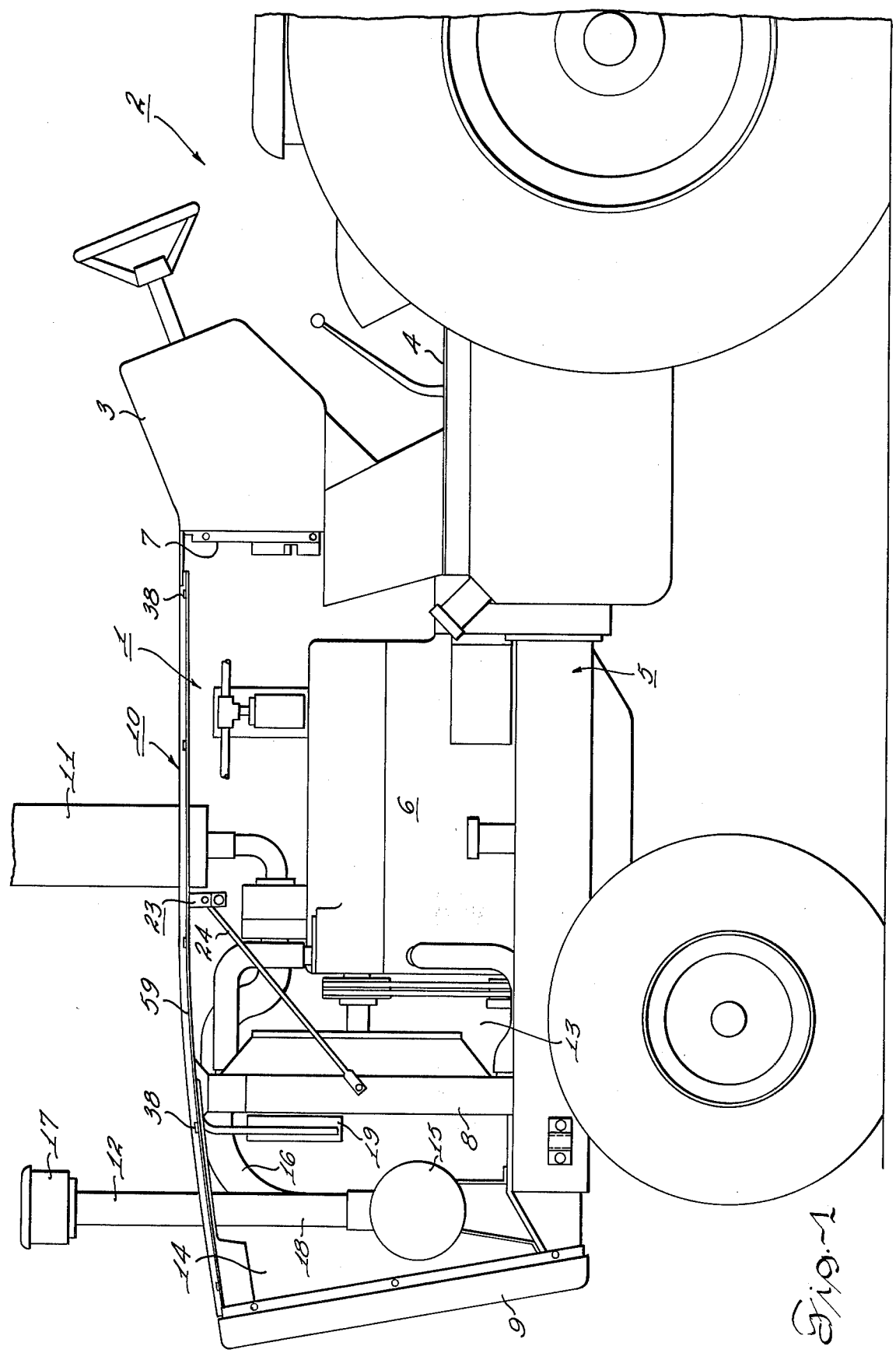

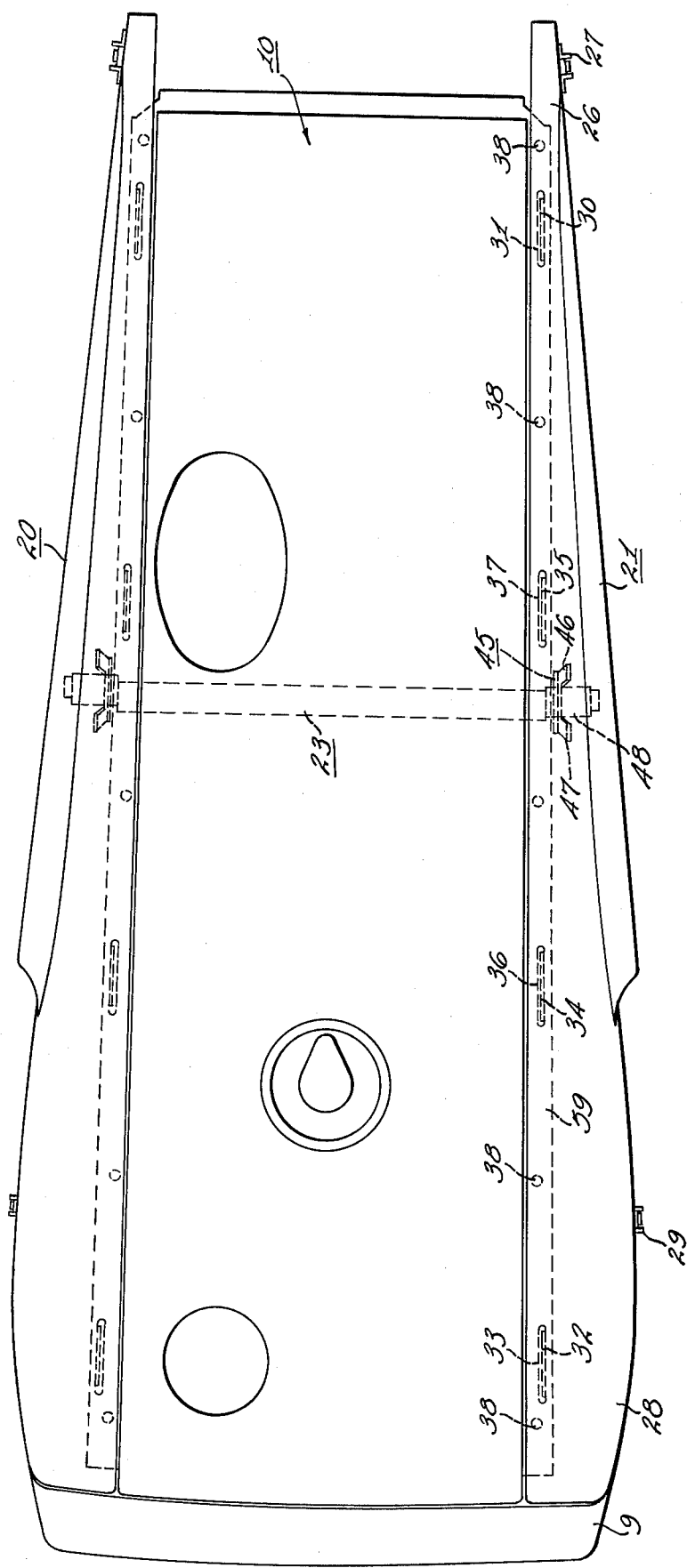

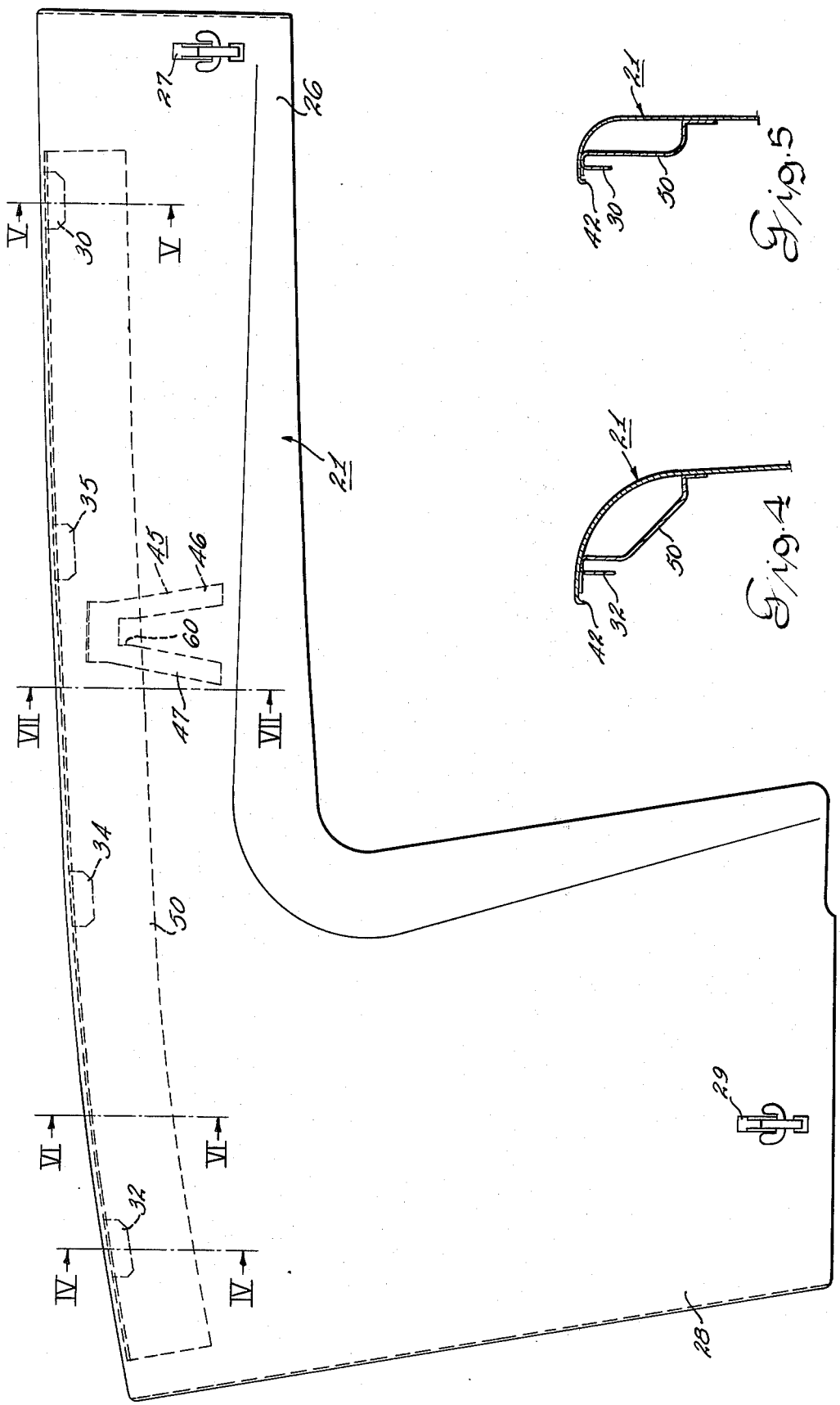

REMOVABLE SIDE PANEL

This invention relates to an engine hood of a vehicle and more particularly to a single removable side panel permitting access to the engine compartment and the accessory compartment.

Conventional vehicles such as tractors having an engine hood and side panels which form the engine compartment have side panels generally hinged at the upper edge to pivot the side panel up and out of the way to gain access to the engine compartment. Generally these type of side panels require that some form of a strut or latch is used to maintain the panel in the raised position to maintain it out of the way for repair or servicing of the engine and components in the engine compartment. To a certain extent this type of a side panel is satisfactory since it does permit access to the engine compartment although propping the side panel on a strut sometimes can be inconvenient and a little dangerous since the wind or the repairman himself may cause the panel to loosen from the prop and fall down on the operator or repairman. This type of a side panel also covers a relatively small area on the side of the engine compartment and does not allow complete access to components of the engine.

Many vehicles today have a radiator which is mounted in front of the engine and set back from a grill which is spaced forwardly of the radiator. This compartment is not always used, however, it may be used for accessory equipment such as air cleaners, filters, fuel tanks, heat exchangers for oil in the transmission or hydraulic accessory equipment. Accessory equipment of this type must be serviced as well as the components in the engine compartment. Accordingly, some vehicles have provided for screw-type fastening arrangement of the panels on the side of the accessory compartment forward of the radiator and behind the grill. To assure frequent servicing and satisfactory care of all the components which are located in the accessory compartment and the engine compartment it is well to make these side panels easily removable so that the operator will attend to the proper and frequent servicing of these components. Accordingly, this invention provides a means whereby the side panel is fastened to the engine hood, which extends down the middle portion and above the engine on the front end of the vehicle. Means are provided for removably connecting the side panels to the engine hood with a guide for aligning the side panel as it is dropped into position. Suitable latching means is also provided on the side panel to fasten the side panel to the supporting structure for the hood and the chassis of the vehicle.

It is an object of this invention to provide a removable side panel to gain access to the engine compartment and the accessory compartment.

It is another object of this invention to provide a removable side panel with provisions for hanging the upper edge on the engine hood and the lower portions latched to the hood supporting means and chassis.

It is a further object of this invention to provide a removable side panel to provide access to the side of the engine compartment and the accessory compartment with means for hanging the side panel on the hood and aligning the side panel as it is dropped in position and suitable means for removably latching the side panel to the vehicle.

The objects of this invention are accomplished by providing a vehicle having a chassis for supporting the engine. The engine extends forwardly from the firewall in front of the operator. Forwardly of the engine is positioned the radiator which forms the rear wall of an accessory compartment. The accessory compartment is formed by the radiator and the grill which are in spaced relation in front of the engine. Extending from the grill rearwardly over the radiator and engine to the firewall is the engine hood. The engine hood provides hanger means having slots for receiving hooks on the upper edge of the side panel. As a side panel is dropped onto the hood the hooks drop into the slots. The panel may carry a guiding means which engages a portion of the engine hood to align it fore and aft for easy assmebly on the hood.

As the side panel swings downwardly and inwardly against the vehicle suitable latching means are provided to removably fasten the side panel to the side of the vehicle. Accordingly, the side panel extends from the firewall to the grill and covers a substantial portion of the side of the vehicle. As the side panel is removed it permits access to the accessory compartment and the engine compartment and does not present the danger of the side panel falling on the operator or repairman when he is servicing the components in these compartments of the vehicle.

The preferred embodiment of this invention is illustrated in the attached drawings.

FIG. 1 illustrates a side view of the vehicle with the side panel removed to show the engine compartment and the accessory compartment with the relative position of the related components therein.

FIG. 2 illustrates the plan view of the forward portion of the vehicle showing the engine hood and the side panels attached thereto.

FIG. 3 illustrates a side elevation view of the side panel.

FIG. 4 is a cross section view taken on line IV—IV of FIG. 3.

FIG. 5 is a cross section view taken on line V—V of FIG. 3.

Figure 8:
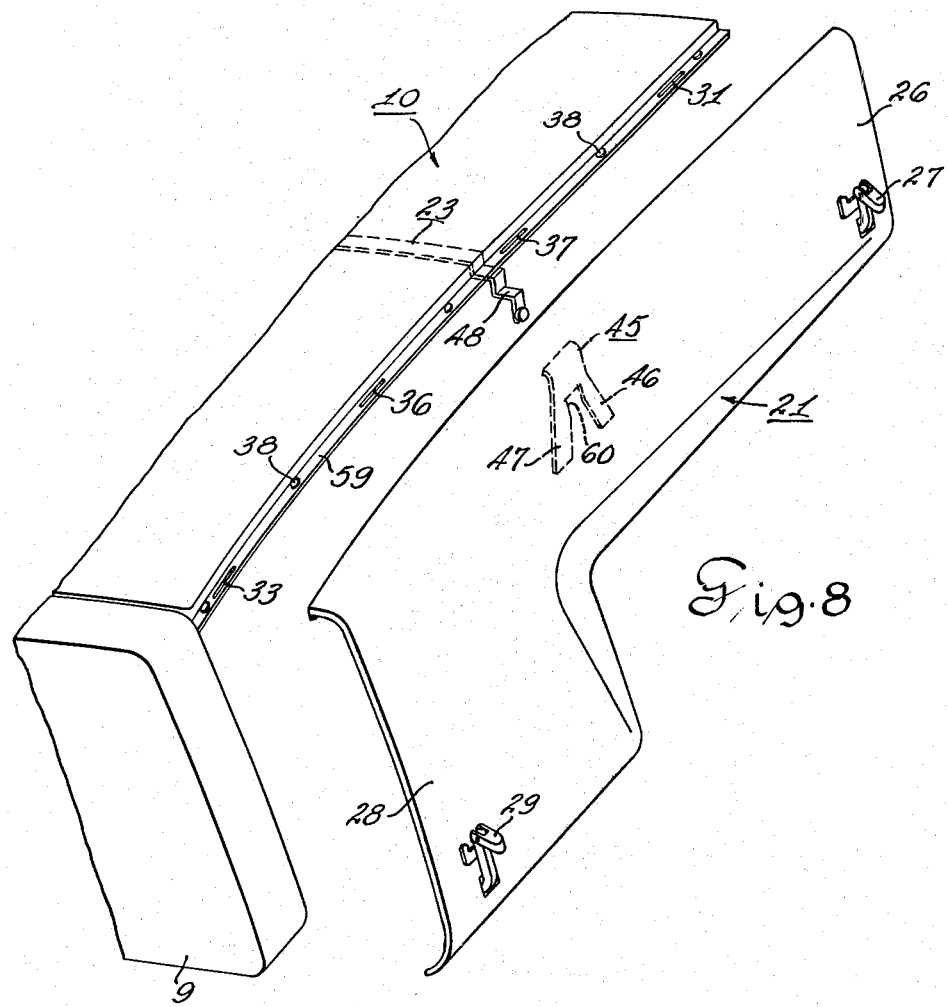
FIG. 8 is a three-dimensional view of the side panel showing the guiding means for aligning the side panel as it is dropped into position on the side of the engine hood.

Referring to the drawings the preferred embodiment of this invention will be described.

Referring to the drawings, FIG. 1 illustrates a side elevation view of the tractor with the side panel removed. The tractor 1 defines an operator station 2 behind the control console 3 and above the platform 4. The chassis 5 supports the platform and control station and extends forwardly to support the engine 6. Immediately behind the engine 6 is the firewall 7. Forwardly of the engine is the radiator 8 and the grill 9. The firewall, radiator and grill 9 support the engine hood 10 on the central portion of the tractor. A muffler 11 and the air inlet 12 are supported on the tractor and extend up through the hood 10. The engine compartment 13 contains the engine 6 and various accessories and components related to the engine which require servicing for the proper operation of the vehicle.

Forwardly of the radiator the accessory compartment 14 is defined by the grill and the radiator and covered by the engine hood 10. The accessory compartment provides a space for the air cleaner 15 and the conduit 16 leading to the intake manifold on the engine 6. The inlet pipe 12 supports the precleaner 17 and extends through the air conduit 18 to the air cleaner 15. Also provided in the accessory compartment is the heat exchanger 19 with suitable connections to the hydraulic system of the tractor for maintaining a cool operating condition of the hydraulic fluid in the hydraulic system. The components of the tractor positioned in the accessory compartment and the engine compartment require frequent servicing and accordingly it is desirable to have a means of access to these compartments. The side panel positioned on the side covers these compartments and provides a means for gaining access to the compartments to readily service these components to provide operation of the tractor.

FIG. 2 illustrates a plan view of the forward portion of the tractor. The plan view shows the engine hood 10 and the the right hand side panel 20 and the left hand side panel 21. The grill 9 is positioned forwardly of the radiator which supports the forward end of the hood 10. The hood extends rearwardly to the firewall 7 which supports the hood. A transverse bracket 23 extends under the hood 10 to provide a support for the engine hood and is connected to a strut 24 on each side of the tractor which extends forwardly to the radiator support. The bracket 23 is fitted with alignment means 25 which is adapted for engaging the guiding means on the side panel.

FIG. 3 illustrates the side panel 21. The side panel 21 has an upper rearwardly extending portion 26 which extends rearwardly alongside the engine compartment and is fitted with the latch 27 for engaging a portion of the vehicle to removably fasten the side panel on its rearward end. The forward portion 28 of the side panel 21 is also provided with a latch 29 which removably fastens the lower portion of the side panel to the chassis. The forward portion 28 of the side panel 21 covers the forward portion of the engine compartment and the accessory compartment. The side panel is fitted with four hooks on its upper edge which are seated in slots of the engine hood where the side panel is fastened.

FIG. 5 illustrates a cross section view of a hook 30 which is fabricated to the upper portion of the side panel 21 and which drops into a slot 31. Similarly, FIG. 4 is a cross section view of the forward portion of the panel 21 in which the hook 32 drops into a slot 33. The hook 32 is welded to the panel 21. Similar hooks 34 and 35 are also provided which seat in the slots 36 and 37 of the engine hood.

Figure 6:
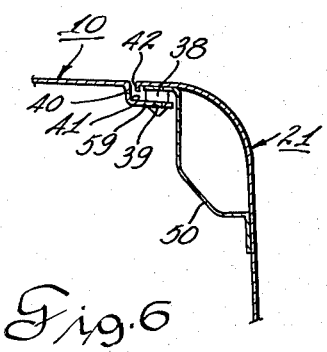
FIG. 6 is a cross section view taken on line VI—VI of FIG. 3 showing a bumper resiliently supporting the upper end of the side panel.

FIG. 6 is a cross section view taken on line VI—VI of FIG. 3 which shows a rubber bumper 38 set in an opening 39 of the engine hood 10. A plurality of these bumpers are fitted along the side of the engine hood on which the side panel 21 seats. It is noted that the side panel 21 is held in spaced relation to the flat mounting portion 59 of the engine hood 10. The vertical portion 40 of the engine hood 10 extends upwardly to the central portion of the engine hood. It is noted that an engine hood forms a longitudinal recess 41 in which the end 42 of the side panel 41 extends and which partially conceals the fact that the side panel is in spaced relation to the engine hood. This prevents contact between the side panel and the engine hood.

Figure 7:
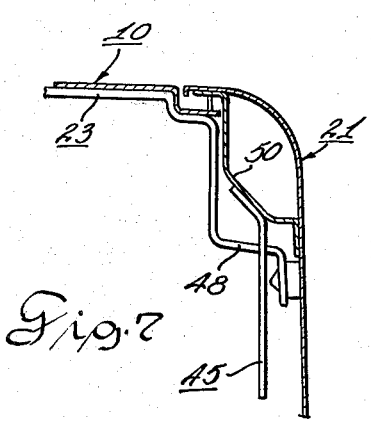
FIG. 7 is a cross section view taken on line VII—VII of FIG. 3.

Referring to FIGS. 7 and 8 the guiding means for seating the side panel on the side of the tractor is illustrated. The side panel 21 is fitted with a guided fork 45 on its inner side. The fork 45 extends downwardly forming two diverging legs 46 and 47. Diverging legs 46 and 47 are adapted for straddling the guiding portion 48 of the end of the bracket 23. FIG. 7 shows the fork 45 fabricated to the bracket 50 which is welded on the side panel 21. The hood 10 is seated on the bracket 23. The bracket 23 extends downwardly to carry the portion 48.

The operation of this device will be described in the following paragraphs.

When it is desired to remove the side panel to service the components in the engine compartment or the accessory compartment the latches 27 and 29 are unlatched and the side panel is then released. The side panel is then free to pivot outwardly on the hooks 30, 35, 34 and 32 which are fitted in the slots 31, 37, 36 and 33. The side panel is then raised upwardly as the hooks are lifted out of the slots in the engine hood. The panel then can be positioned at some remote storage area while the vehicle is being serviced.

When it is desired to reassemble the side panel on the vehicle the side panel is raised alongside of the vehicle and lowered until the slot 60 between the divergent legs 46 and 47 of the aligned fork 45 is positioned fore and aft of the aligned portion 48. The aligned fork provides an alignment of the panel on the side of the vehicle and as the panel is lowered it is forced to align the panel so that the hooks 30, 35, 34 and 32 will fall within the slots 31, 37, 36 and 33 as the side panel bears against the side of the engine hood 10. As the side panel is then lowered the hooks are received in the slots and the panel again is pivotally supported on the hooks. The latches 27 and 29 are then engaged as the panel is pressed in against the side of the vehicle and the side panel is in position for operation of the vehicle.

The embodiments of the invention in which an exclusive property or privilege is claimed are defined as follows:

1. A removable side panel on an engine hood of a tractor comprising, a vehicle chassis, an engine hood, a front engine hood support means for said engine hood supported on said chassis including, a grill means supporting the forward end of said hood, and a radiator rearwardly of said grill means supporting a portion of said hood and defining an accessory compartment forward of the engine with an access opening on the side of said tractor, a rear engine hood support means defining an engine compartment with the rear portion of said front engine hood support means rearwardly of said radiator with a second access opening on the side of said tractor, a removable side panel extending substantially the length of the engine compartment and the accessory compartment removably supported on said engine hood, said hood including a mounting portion for mounting said side panel, an upper supported edge portion on said side panel for supporting said side panel on said engine hood, hook and slot means interconnecting said side panel with said hood, alignment means including guiding means on said engine hood and guided means on said panel to facilitate mounting said side panel on said engine hood, latch means removably fastening said side panel on the side of said tractor permitting removal of said panel to thereby provide complete access to said accessory compartment and said engine compartment through said access openings.

2. A removable side panel on an engine hood of a tractor as set forth in claim 1 including means supporting an air cleaner inlet for extending through said hood.

3. A removable side panel on an engine hood of a tractor as set forth in claim 1 including means supporting a muffler for extending through the hood of said engine hood.

4. A removable side panel on an engine hood of a tractor as set forth in claim 1 wherein said side panel mounting portion on said hood defines a supporting surface, said upper supporting edge portion on said side panel defining a supported panel surface, a plurality of rubber bumpers positioned intermediate the supporting surface of said side panel mounting portion of said engine hood and the supported surface of the upper edge portion of said side panel to resiliently mount said side panel on said engine hood, said hook and slot means include slots in said supporting surface and hooks on said supported surface.

5. A removable side panel on an engine hood of a tractor as set forth in claim 1 including an air cleaner mounted in the accessory compartment.

6. A removable side panel on an engine hood of a tractor as set forth in claim 1 wherein said hood mounting portion defines a plurality of horizontally positioned slots, the upper portion of said side panel defines a plurality of downwardly extending hooks for reception in said slots to suspend said side panel on said hood by said hook and slot means.

7. A removable side panel on an engine hood of a tractor as set forth in claim 6 wherein said alignment means includes said guiding means mounted on the side of said engine hood, said guided means includes an alignment fork fastened to the inner side of said side panel having downwardly extending legs for alignment on said guiding means to align the hooks on said side panel in the slots on said hood as it is assembled on said hood.

8. A removable side panel of an engine hood of a tractor as set forth in claim 1 wherein said mounting portion of said hood defines a mounting surface and a plurality of slots of said hook and slot means on said hood, said supported edge portion defines a supported surface and a plurality of hooks mounted on said side panel for reception in said slots, a plurality of rubber bumpers between said mounting surface and said supported surface for resiliently mounting said panel in spaced relation on said hood to prevent contact between said side panel and said hood.

9. A removable side panel on an engine hood of a tractor as set forth in claim 1 wherein said side panel mounting portion on said hood defines a horizontal mounting surface, said upper supported edge portion on said side panel defines a mating supported surface, rubber bumpers positioned between said surfaces of said hood and panel to resiliently seat said panel, a rubber bumper on said guiding means engaging said panel on a vertical surface.

10. A removable side panel on an engine hood of a tractor as set forth in claim 1 wherein said rearward engine hood support means defines a firewall for supporting the rear portion of said engine hood.

* * * * *